United States Patent
Stiehl et al.

(10) Patent No.: US 8,655,422 B2
(45) Date of Patent: Feb. 18, 2014

(54) RING-SHAPED COVER FOR PORTABLE ELECTRONIC DEVICE

(75) Inventors: Kurt Stiehl, San Jose, CA (US); Cameron Frazier, San Carlos, CA (US); Richard Howarth, San Francisco, CA (US); Jeremy Bataillou, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 834 days.

(21) Appl. No.: 12/794,570

(22) Filed: Jun. 4, 2010

(65) Prior Publication Data

US 2011/0297578 A1 Dec. 8, 2011

(51) Int. Cl.
*H04M 1/00* (2006.01)

(52) U.S. Cl.
USPC .................. 455/575.8; 455/575.1; 361/730

(58) Field of Classification Search
USPC ......... 455/575.8, 575.1; 156/242; 361/679.01, 361/730
See application file for complete search history.

(56) References Cited

U.S. PATENT DOCUMENTS

| | | | | |
|---|---|---|---|---|
| 3,907,624 | A | * | 9/1975 | Gravely, Jr. .................. 156/214 |
| 5,360,108 | A | * | 11/1994 | Alagia .......................... 206/320 |
| D357,918 | S | * | 5/1995 | Doria ............................ D14/218 |
| 6,201,867 | B1 | | 3/2001 | Koike |
| 6,512,834 | B1 | * | 1/2003 | Banter et al. .................. 381/386 |
| 7,158,376 | B2 | | 1/2007 | Richardson et al. |
| 7,194,291 | B2 | | 3/2007 | Peng |
| D563,093 | S | * | 3/2008 | Nussberger .................... D3/201 |
| D574,819 | S | * | 8/2008 | Andre et al. ................... D3/269 |
| D597,089 | S | * | 7/2009 | Khan et al. .................... D14/250 |
| D609,463 | S | * | 2/2010 | Bullen ........................... D3/218 |
| D610,807 | S | * | 3/2010 | Bau ............................... D3/269 |
| D611,042 | S | * | 3/2010 | Ferrari et al. ................. D14/250 |
| 7,941,197 | B2 | * | 5/2011 | Jain et al. ..................... 455/575.8 |
| 8,051,980 | B2 | * | 11/2011 | Tai et al. ....................... 206/320 |
| 8,190,222 | B2 | * | 5/2012 | Cheng ........................... 455/575.8 |
| 2003/0236102 | A1 | * | 12/2003 | Kawai et al. .................. 455/550.1 |
| 2004/0097276 | A1 | | 5/2004 | Harmon |
| 2008/0227504 | A1 | * | 9/2008 | Chan ............................. 455/575.1 |
| 2008/0227507 | A1 | * | 9/2008 | Joo ................................ 455/575.8 |
| 2009/0111543 | A1 | * | 4/2009 | Tai et al. ....................... 455/575.8 |
| 2009/0117942 | A1 | * | 5/2009 | Boningue et al. ............. 455/564 |
| 2009/0175001 | A1 | * | 7/2009 | Mathew et al. ............... 361/679.59 |
| 2009/0184893 | A1 | | 7/2009 | Yang |
| 2009/0257207 | A1 | * | 10/2009 | Wang et al. ................... 361/752 |
| 2010/0015400 | A1 | * | 1/2010 | Tokuchi et al. ............... 428/172 |
| 2010/0093412 | A1 | * | 4/2010 | Serra et al. ................... 455/575.8 |
| 2010/0124040 | A1 | * | 5/2010 | Diebel et al. .................. 361/816 |
| 2010/0142154 | A1 | * | 6/2010 | Collet et al. ................... 361/714 |
| 2010/0238119 | A1 | * | 9/2010 | Dubrovsky et al. ........... 345/169 |
| 2011/0077909 | A1 | * | 3/2011 | Gregory et al. ............... 702/187 |
| 2011/0147973 | A1 | * | 6/2011 | Sung et al. .................... 264/40.5 |

* cited by examiner

*Primary Examiner* — Kashif Siddiqui
*Assistant Examiner* — Mong-Thuy Tran
(74) *Attorney, Agent, or Firm* — Womble Carlyle Sandridge & Rice LLP

(57) ABSTRACT

An outer cover for an electronic device, such as a portable electronic device, is disclosed. Since portable electronic devices are often portable, they can be damaged, such as scratched, dented, broken, and the like, when transported or used. The outer cover can serve to provide a protective member over part of the housing for the electronic device. The protective member, when placed on the portable electronic device can serve to reduce damage to sides of the portable electronic device. While the outer cover can provide side and/or edge protection, the outer cover need not also provide front or rear protection.

22 Claims, 13 Drawing Sheets

RING-SHAPED COVER FOR PORTABLE ELECTRONIC DEVICE

BACKGROUND OF THE INVENTION

Portable electronic devices are commonplace today. Some examples of portable electronic devices include portable digital assistants, portable media players, mobile telephones, and portable game players.

A conventional portable electronic device includes a housing that forms an external surface of the portable electronic device. The housing often supports a display and user input devices. The display can present a graphical user interface to a user of the portable electronic device. The user input devices can include buttons, touchpads, and/or dials that allow the user to interact with the portable electronic device. The housing of the portable electronic device can also include one or more external connection ports. The external connection ports allow the portable electronic device to be connected to a host device (e.g., personal computer) or other electronic devices (e.g., docking station), so as to exchange data or to charge a battery utilized by the portable electronic device.

Typically, the exposed surfaces of portable electronic devices are relatively easily damaged such as by scratches, dents and the like. Covers, skins or cases have been conventionally utilized to provide protection for the exterior surfaces of portable electronic devices. Accordingly, users can protect their portable electronic devices by placing covers or skins around their portable electronic devices. Unfortunately, the covers, skins or cases tend to impede use of the portable electronic device. Hence, there is a continuing need for improved approaches to provide ways to protect portable electronic devices with minimal hindrance to usage.

SUMMARY

The invention pertains to an outer cover for an electronic device, such as a portable electronic device. Since portable electronic devices are often portable, they can be damaged, such as scratched, dented, broken, and the like, when transported or used. The outer cover can serve to provide a protective member over part of the housing for the electronic device. The protective member, when placed on the portable electronic device can serve to reduce damage to sides of the portable electronic device. While the outer cover can provide side and/or edge protection, the outer cover need not also provide front or rear protection. The invention is particularly well suited for handheld electronic devices.

In one embodiment, the outer cover can be formed from material of different harnesses. For example, a middle portion can be formed from a stiff plastic material, while one or more outer portions can be formed from an elastomer that has more compliance capability that the stiff plastic material. The outer cover with the different materials can be formed through injection molding. In one embodiment, the injection molding can use a double-shot injection molding to form the outer cover. The first shot of injecting molding being for the stiff plastic material and the second shot being for the compliant elastomer material. One or more alignment features can be formed in the middle portion to facilitate subsequent alignment for formation of the one or more outer portions.

In one embodiment, the outer cover can include an elastomer section that facilitates slight expansion of the outer cover. The slight expansion facilitates attachment and removal of the outer cover to an electronic device, while still being able to be securely attached to the electronic device when acting as an outer cover therefor.

In one embodiment, the outer cover can include one or more openings that facilitate usage of an electronic device with the outer cover in place. For example, the one or more opening in the outer cover can correspond to a connector location (e.g., input/output connector, audio jack, speaker openings, etc.) of the electronic device. These openings allow access to connector(s) of the electronic device through the outer cover. As another example, the one or more openings can support actuators that are provided with the outer cover. Typically, the actuators are positioned within the outer cover such that their placement corresponds to the location of switches (e.g., buttons) on the electronic device.

The invention may be implemented in numerous ways, including, but not limited to, a system, device, apparatus or method. Exemplary embodiments of the invention are discussed below.

As a protective cover for a portable electronic device, one embodiment can, for example, include at least a middle ring having at least one opening for access to an input component of the portable electronic device, a top ring integral with or attached to a top portion of the middle ring, and a bottom ring integral with or attached to a bottom portion of the middle ring.

As a ring-shape cover having an opening configured to receive a portable electronic device, one embodiment can, for example, include at least a center band formed of a first material, a top band formed of a second material and integral with a top portion of the center band, and a bottom band formed of the second material and integral with a bottom portion of the center band.

As a method for forming a cover for a portable electronic device, one embodiment can, for example, operate to form an inner band structure using a first moldable material. Once the inner band structure is formed, at least one outer band structure using a second moldable material can be formed and bonded to the inner band structure.

As a method for forming a cover for a portable electronic device, another embodiment can, for example, configure an injection molding apparatus for a first molding operation. Once configured, the first molding operation can be performed using a first moldable material to form a middle band structure. Afterwards, the injection molding apparatus can be configured for a second molding operation. The second molding operation can then be performed using a second moldable material to form a top band structure and/or a bottom band structure onto the middle band structure that has already formed.

As a kit, one embodiment can, for example, include at least a portable electronic device, and a protective cover for the portable electronic device. The protective cover can include at least a middle ring having at least one opening for access to an input component of the portable electronic device, a top ring integral with or attached to a top portion of the middle ring, and a bottom ring integral with or attached to a bottom portion of the middle ring.

As an edge cover for an electronic device, one embodiment can, for example, include at least a removable peripheral member that surrounds the peripheral sides of an electronic device in order to protect peripheral sides of the electronic device. The removable peripheral member can include a middle band and an upper and lower band disposed above and below the middle band. The middle band primarily can have a first material characteristic, and the upper and lower bands can have a second material characteristic that is different from the first material characteristic.

As an edge cover for an electronic device, another embodiment can, for example, include at least a removable peripheral member that surrounds peripheral sides of an electronic device in order to protect the peripheral sides of the electronic device. The peripheral member can have an opening extending through the peripheral member and configured to receive the electronic device. The peripheral member can form a band configured to fit around the peripheral sides of the electronic device.

As an expandable edge cover for an electronic device, one embodiment can, for example, include at least a first portion in the form of a middle band having a cut out section thereby making it non-continuous, and a second portion integrally formed with the first portion. The second portion can fill the cut out section and form a continuous upper and lower band. The second portion can be formed from a compliant material thereby allowing the edge cover to flex when the electronic device is inserted therein.

Various aspects and advantages of the invention will become apparent from the following detailed description taken in conjunction with the accompanying drawings.

BRIEF DESCRIPTION OF THE DRAWINGS

The invention will be readily understood by the following detailed description in conjunction with the accompanying drawings, in which.

DETAILED DESCRIPTION OF EMBODIMENTS OF THE INVENTION

Figure 1:
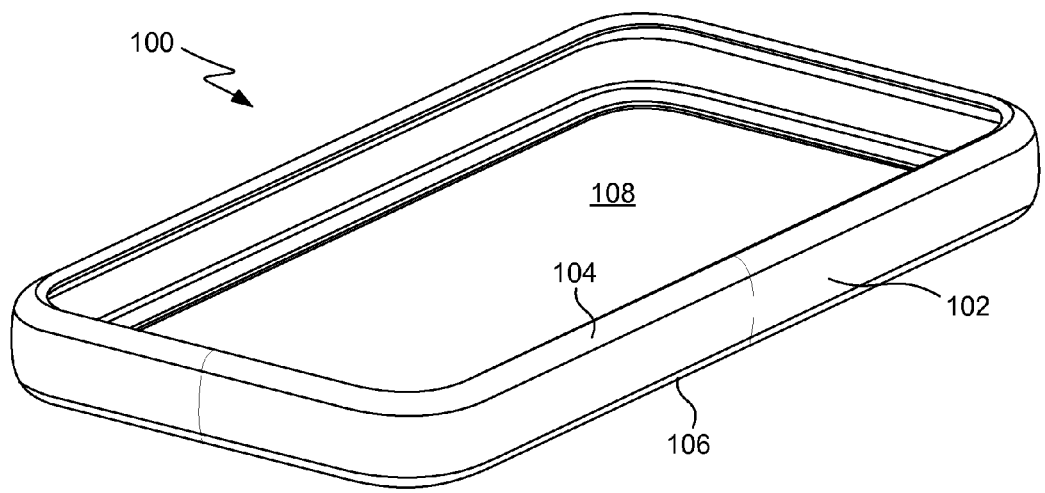
FIG. 1 is a perspective diagram of an outer cover for an electronic device according to one embodiment.

The invention pertains to an outer cover for an electronic device, such as a portable electronic device. Since portable electronic devices are often portable, they can be damaged, such as scratched, dented, broken, and the like, when transported or used. The outer cover can serve to provide a protective member over part of the housing for the electronic device. The protective member, when placed on the portable electronic device can serve to reduce damage to sides of the portable electronic device. While the outer cover can provide side and/or edge protection, the outer cover need not also provide front or rear protection.

In one embodiment, the outer cover can be formed from material of different harnesses. For example, a middle portion can be formed from a stiff plastic material, while one or more outer portions can be formed from an elastomer that has more compliance capability that the stiff plastic material. The outer cover with the different materials can be formed through injection molding. In one embodiment, the injection molding can use a double-shot injection molding to form the outer cover. One or more alignment features can be formed in the middle portion to facilitate subsequent alignment for formation of the one or more outer portions.

In one embodiment, the outer cover can include an elastomer section that facilitates slight expansion of the outer cover. The slight expansion facilitates attachment and removal of the outer cover to an electronic device, while still being able to be securely attached to the electronic device when acting as an outer cover therefor.

In one embodiment, the outer cover can include one or more openings that facilitate usage of the electronic device with the outer cover in place. For example, the one or more opening in the outer cover can correspond to a connector location (e.g., input/output connector, audio jack, speaker openings, etc.) of the electronic device. These openings allow access to connector(s) of the electronic device through the outer cover. As another example, the one or more openings can support actuators that are provided with the outer cover. Typically, the actuators are positioned within the outer cover such that their placement corresponds to the location of switches (e.g., buttons) on the electronic device.

The invention is particularly well suited for portable electronic devices, and more particularly handheld electronic devices. Examples of portable electronic devices can include laptops, tablet computers, portable media players, mobile phones, mobile GPS units, remote controls, personal digital assistant (PDAs), and the like.

Embodiments of the invention are discussed below with reference to FIGS. 1-12. However, those skilled in the art will readily appreciate that the detailed description given herein with respect to these figures is for explanatory purposes as the invention extends beyond these limited embodiments. The illustrations provided in these figures are not necessarily drawn to scale; instead, the illustrations are presented in a manner to facilitate presentation.

FIG. 1 is a perspective diagram of an outer cover 100 for an electronic device according to one embodiment. The outer cover 100 serves to protect at least a portion of a housing of the electronic device. Typically, the electronic device is a portable device, i.e., a portable electronic device.

The outer cover 100 is designed to surround sides of the electronic device, while leaving primary front and rear sides open (or uncovered). As shown in FIG. 1, the outer cover 100 can include a middle band 102 that can have a ring shape configured to extend around the sides of the electronic device. The outer cover 100 can also includes a top band 104 that is bound to the middle band 102. The top band 104 can also have a ring shape that is configured to extend around the sides of the electronic device. The outer cover 100 can also include a bottom band 106 that is bound to the middle band 102 which forms a ring that is configured to extend around the sides of the electronic device.

Since the outer cover 100 is designed to surround the sides of the electronic device while leaving the primary front and rear sides open, the outer cover 100 includes an opening 108 that extends through the each of the middle band 102, the top band 104 and the bottom band 106. When the outer cover 100 is to be utilized, the electronic device can be placed within the opening 108 of the outer cover 100 and removably secured (e.g., frictional fit) to the outer cover 100. In one embodiment, the electronic device can be inserted into the opening 108 from either the primary front side or the primary rear side.

As further discussed in detail below, the materials utilized for the middle band 102, the top band 104 and the bottom band 106 can vary depending upon implementation. For example, the middle band 102 can be formed from a plastic that provides a relatively strong and rigid structure for the outer cover 100. The top band 104 and the bottom band 106 can be formed from an elastomer that offers less rigidity and more compliance than does the middle band 102. For example, the middle band 102 can be formed from a plastic, such as Acrylonitrile butadiene styrene (ABS) plastic or polycarbonate. For example, the top band 104 and the bottom band 106 can be formed from a thermoplastic, such as Thermoplastic Vulcanizate (TPV) or Thermoplastic Silicone Vulcanizate (TPSiV). A specific example of a suitable material for the top band 104 and the bottom band 106 is TPSiV 3515 60A.

Figure 2A:
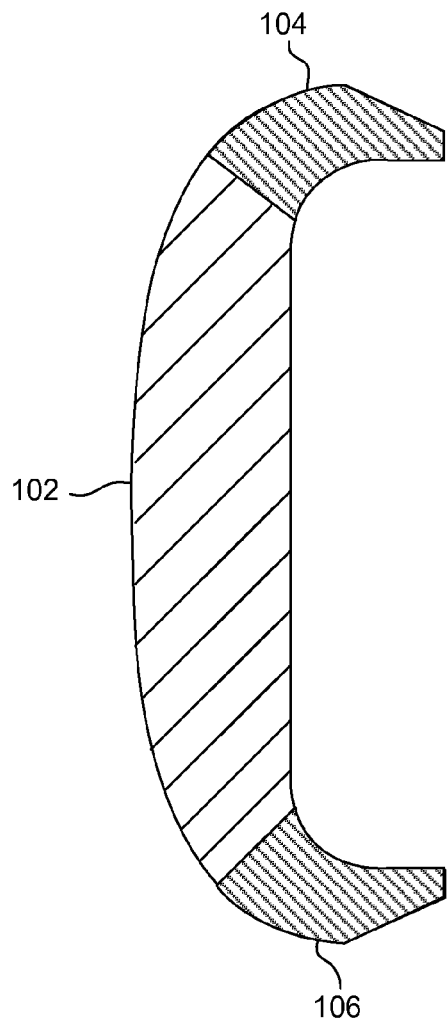
FIG. 2A is a side sectional view of the outer cover illustrated in FIG. 1, according to one embodiment.

FIG. 2A is a side sectional view of the outer cover 100 illustrated in FIG. 1, according to one embodiment. The side sectional view indicates the top band 104 affixed to the top surface of the middle band 102, and the bottom band 106 affixed to the bottom surface of the middle band 102. In this embodiment, the middle band 102, the top band 104 and the bottom band 106 can each be formed of a different material. Typically, in one embodiment, as noted above, the material for the top band 104 and the bottom band 106 are the same but nevertheless differ from the material for the middle band 102. For example, a multi-mold molding process can be used to form the outer cover 100.

Further in the outer cover 100 shown in FIG. 2A, the outer edges of the top band 104 can be referred to as being flared out or having flanges. Since the top band 104 and the bottom band 1006 are compliant, the flanges are compliant. These flanges can serve to cover (and thus protect) front and rear face edges of the electronic device. FIG. 3 discussed below illustrates front and rear face edges of an electronic device being protected by outer portions (e.g., flanges) of an outer cover.

Figure 2B:
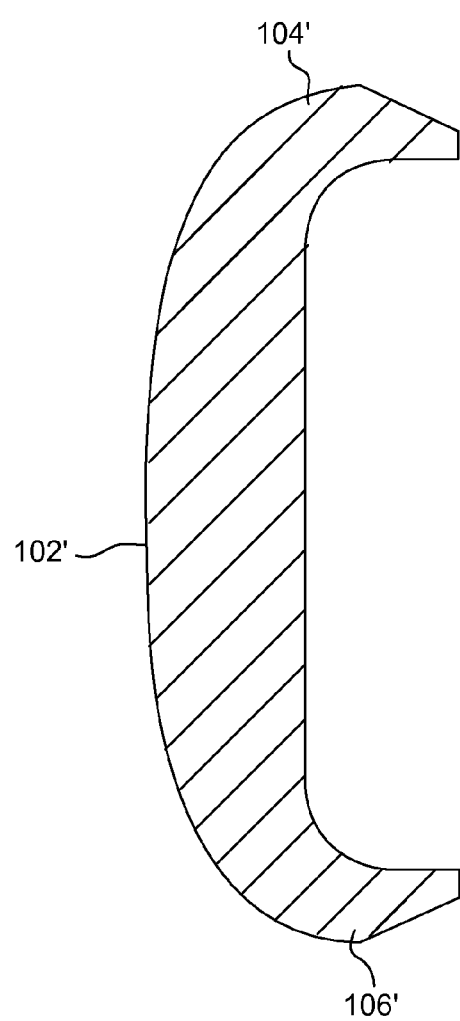
FIG. 2B is a side sectional view of an outer cover according to an alternative embodiment.

FIG. 2B is a side sectional view of an outer cover 100' illustrated in FIG. 1, according to an alternative embodiment. The side sectional view indicates a top band 104' affixed to the top surface of a middle band 102', and a bottom band 106' affixed to the bottom surface of the middle band 102'. In this embodiment, the middle band 102', the top band 104' and the bottom band 106' are all formed from the same material. Hence, in this alternative embodiment, the outer cover 100' can be formed from a single material. In such case, the assembly for the outer cover need not form separate members that are then attached to one another. Instead, the outer cover can be formed as a single piece (i.e., a unitary structure). For example, a single mold molding process can be used to form the outer cover 100'.

Figure 3A:
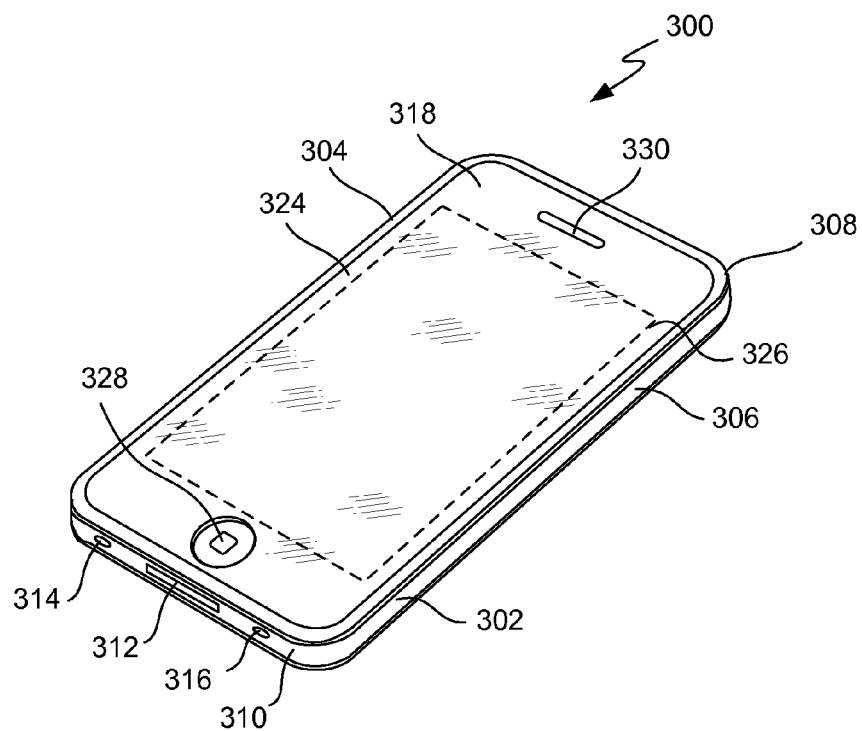
FIG. 3A is a perspective view of an exemplary portable electronic device in accordance with one embodiment.

FIG. 3A is a perspective view of an exemplary portable electronic device in accordance with one embodiment. Outer periphery member 302 can surround the periphery of electronic device 300 to form some or all of the outer-most side surfaces (e.g., surfaces 304, 306, 308 and 310) of the electronic device. Outer periphery member 302 can have any suitable shape, including for example one or more elements that can be combined to form a ring. More generally, as examples, the outer periphery member 302 can have a substantially rectangular shape (e.g., having straight or rounded edges or corners), a circular shape, an oval shape, a polygonal shape, or any other closed shape that can define a volume.

In some embodiments, outer periphery member 302 can include one or more openings, knobs, extensions, flanges, chamfers, or other features for receiving components or elements of the device. The features of outer periphery member 302 can extend from any surface of the outer periphery member, including for example from internal surfaces (e.g., to retain internal components or component layers), or from external surfaces. As one example, outer periphery member 302 can include connector opening 312 (e.g., for a 30-pin connector) for receiving a connector. Outer periphery member 302 can include openings 314 and 316 for providing audio to a user (e.g., an opening for audio output from an internal speaker), or receiving audio from a user (e.g., an opening for an internal microphone). Outer periphery member 302 can instead or in addition include openings for an audio connector, a power supply connector, or other features for retaining and enabling a power switch, a volume control switch or a ring silencing switch. As an example, the switches can be implemented as buttons.

The various features of outer periphery member 302 can be constructed using any suitable approach and at any suitable time. In some embodiments, the features can be constructed as part of a process that creates outer periphery member 302 from a single piece of material that is manufactures into the final shape of outer periphery member 302 (e.g., using a machining process). In some embodiments, several pieces of material can instead or in addition be shaped individually and combined into outer periphery member 302. Outer periphery member 302 can be constructed from any suitable material, including for example a metal (e.g., steel or aluminum), plastic (e.g. polyurethane, polyethylene or polycarbonate), composite material, or any combination thereof. In some embodiments, outer periphery member 302 can be constructed from the combination of several materials.

Electronic device 300 can include first cover assembly 318 and back cover assembly 320 providing the back and front surfaces of the electronic device, respectively. Each cover assembly 318 and 320 can be coupled to outer periphery member 302 using any suitable approach, including for example using an adhesive, tape, mechanical fastener, hooks, screws, tabs, or combinations thereof. In some embodiments, one or both of cover assemblies 318 and 320 can be removable, for example for servicing or replacing electronic device components (e.g., a battery). In some embodiments, cover assemblies 318 and 320 can include several distinct parts, including for example a fixed part and a removable part. The inner surfaces of front cover assembly 318 and back cover assembly 320 can include any suitable feature, including for example one or more ridges, hooks, tabs, extensions, or any combination thereof for retaining the covers or ensuring proper alignment of the covers. The features of cover assemblies 318 and 320 can interact with corresponding features of outer periphery member 302) or other components of the electronic device to ensure proper placement of the covers. Back cover assembly 320 and front cover assembly 318 can be positioned in any suitable manner relative to outer periphery member 302.

Returning to electronic device 300, back cover assembly 320 and front cover assembly 318 can be constructed from any suitable material or combination of materials. In some embodiments, each of cover assemblies 318 and 320 can be constructed by combining several distinct components. For example, one or both cover assemblies 318 and 320 can include a transparent or translucent plate (e.g., a rectangular plate of glass). As another example, one or both cover assemblies can include a base or support structure constructed from one or more of a metal (e.g., aluminum) or plastic onto which a transparent component can be assembled. The transparent component can be assembled using any suitable approach, including for example such that one or more electronic device components can be visible through the transparent component (e.g., display circuitry), or can receive signals or detect a user's environment through the transparent component (e.g., sensors). Alternatively, one or more portions of the transparent plate can be rendered opaque (e.g., using an ink, or by placing a support structure behind the transparent plate) such that the transparent plate can also serve as a cosmetic purpose. The different components of each cover assembly 318 and 320 can be assembled using any suitable approach, including for example using one or more of an adhesive, fastener, tape, interlocking components, overmolding or manufacturing process, or any combination of these.

Front cover assembly 318 can include support structure 322 on which glass plate 324 can be assembled. Support structure 322 can include one or more openings, including an opening through which display 326 can be provided. In some embodiments, support structure 324 and glass plate 326 can include openings for device components, such as button opening 328 and receiver opening 330. The size and shape of the openings 328 and 330 can be selected using any suitable approach, including for example based on the size and shape of the device components placed in or underneath the openings (e.g., opening 328 can determined by the size of the button, while opening 330 can be determine from the size of the receiver, and acoustic considerations for providing sufficient audio to a user).

In some embodiments, front cover assembly 318 can support or enable one or more interfaces by which a user can use the electronic device. For example, front cover assembly 318 can support a touch interface (e.g., a touch pad or a touch screen) for controlling electronic device processes and operations. As another example, front cover assembly 318 can include one or more buttons or sensors (described above) for interacting with the device. In some cases, buttons, switches or other interface elements can be instead or in addition incorporated in outer periphery member 302 or back cover assembly 320. Electronic device 300 can include any other suitable interface for interacting with a user, including for example display circuitry, a projector, audio output circuitry (e.g., speakers or a an audio port), a haptic interface (e.g., a motor for creating vibrations, or a power source for providing an electrical stimulus), or combinations of these.

In one embodiment, electronic device 300 can also provide back cover assembly 320 in a similar as front cover assembly 318. Back cover assembly 320 can include support structure 332 on which glass plate 334 can be assembled. Support structure 332 may or may not need openings for device components. Although back cover assembly 320 can, like front cover assembly 318, support or enable one or more interfaces by which a user can use the electronic device, back cover assembly 320 need not support any interfaces.

Figure 3C:
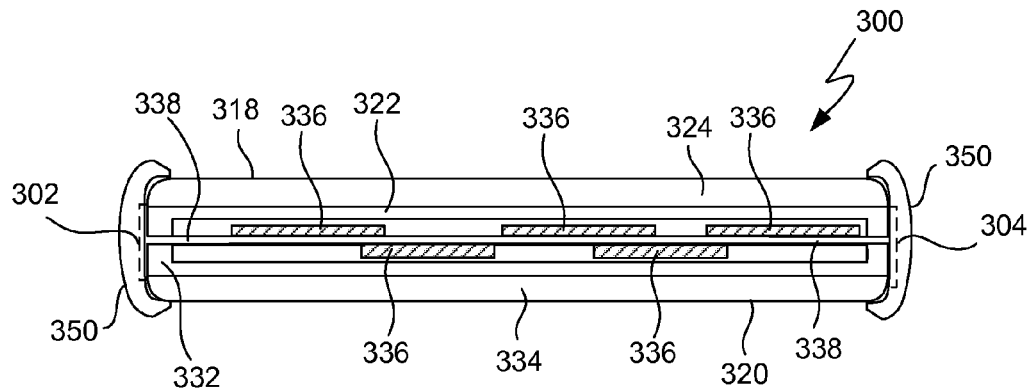
FIG. 3C is a cross-sectional view of the outer cover together with the electronic device as illustrated in FIG. 3B in accordance with one embodiment.
Figure 3B:
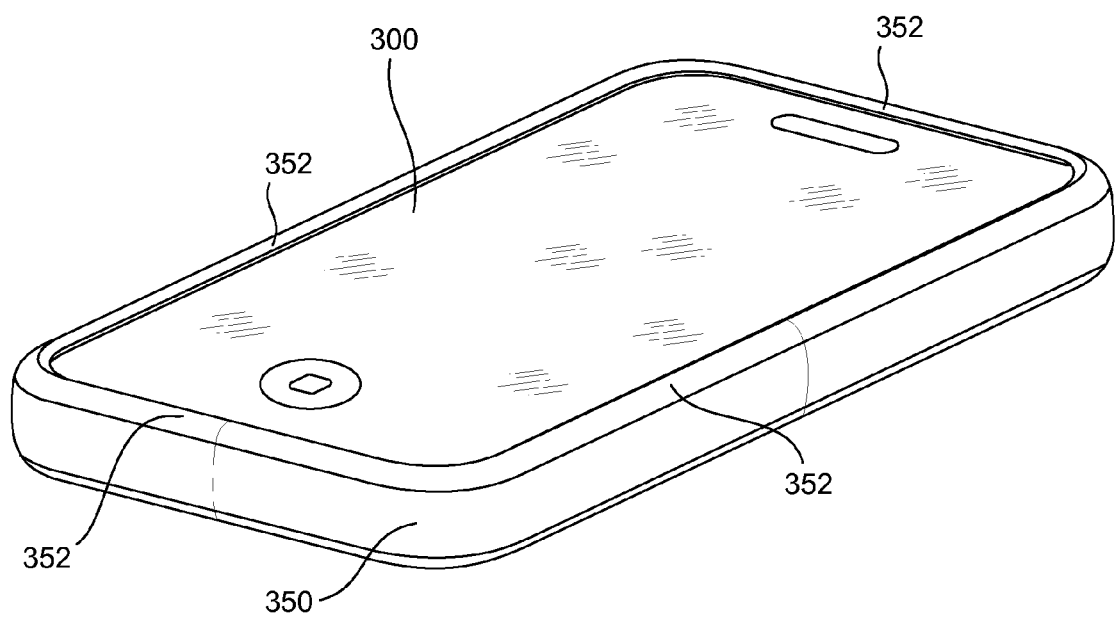
FIG. 3B is a perspective view of an outer cover provided on the portable electronic device illustrated in FIG. 3A.

FIG. 3B is a perspective view of an outer cover 350 provided on the portable electronic device 300 illustrated in FIG. 3A. The outer cover 350 can, for example, be similar to the outer cover 100 illustrated in FIG. 1. As shown in FIG. 3B, when the portable electronic device 300 is inserted into the outer cover 350, sides of the portable electronic device 300 are protected by the corresponding sides of the outer cover 350. The front and rear surfaces of the portable electronic device 300 remain exposed and are not covered. However, the front and rear surfaces of the portable electronic device 300 can be partly protected at the edges. Here, the outer cover 300 does provide covering for the edges of the front and rear surfaces and is able to provide some protection. For example as shown in FIG. 3B, the outer cover 350 include a front surface edge cover 352 that extends around the periphery of the outer cover 350.

FIG. 3C is a cross-sectional view of the outer cover 350 together with the electronic device 300 as illustrated in FIG. 3B, in accordance with one embodiment. Internal to the outer cover are multiple electrical components 336 that are typically secured to a supporting plate 338. The supporting plate 338 can be secured to or integral with the outer periphery member 302. The sides (as well as the edges) of the electronic device 300 are being protected by the outer cover 350.

Figure 4:
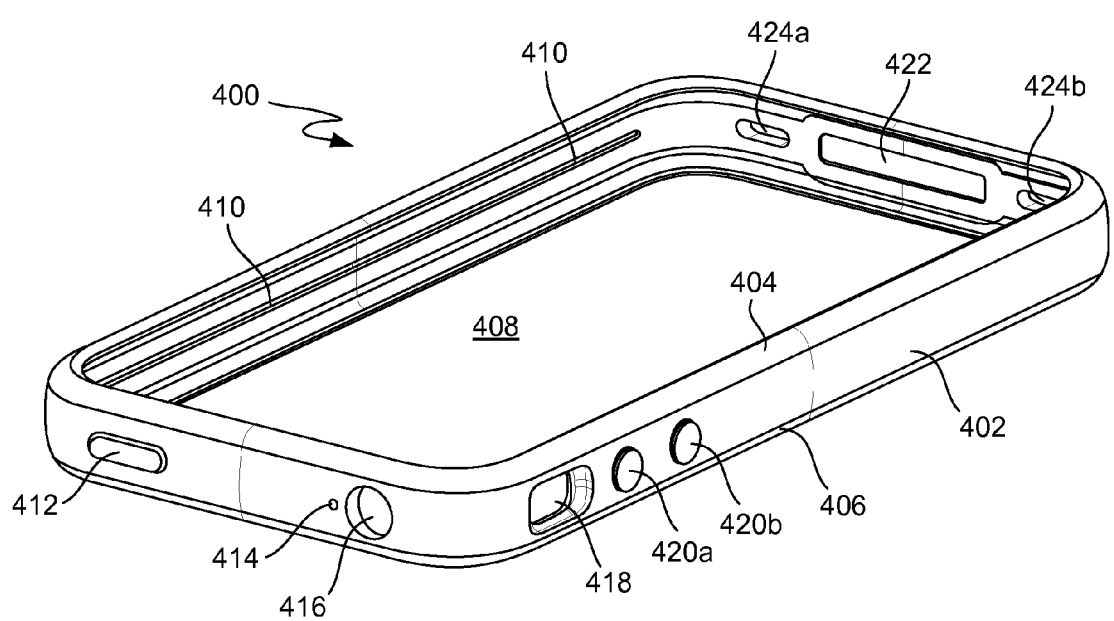
FIG. 4 is a perspective diagram of an outer cover for an electronic device according to another embodiment.

FIG. 4 is a perspective diagram of an outer cover 400 for an electronic device according to another embodiment. The outer cover 400 serves to protect at least a portion of a housing of the electronic device. Typically, the electronic device is a portable device, i.e., a portable electronic device.

The outer cover 400 is designed to surround sides of the electronic device, while leaving primary front and rear sides open (or uncovered). As shown in FIG. 4, the outer cover 400 can include a middle band 402 that has a ring shape configured to extend around the sides of the electronic device. The outer cover 400 can also includes a top band 404 that is bound to the middle band 402. The top band 404 can also have a ring shape that is configured to extend around the sides of the electronic device. The outer cover 400 can also include a bottom band 406 that is bound to the middle band 402 which forms a ring that is configured to extend around the sides of the electronic device.

Since the outer cover 400 is designed to surround the sides of the electronic device while leaving the primary front and rear sides open, the outer cover 400 includes an opening 408 that extends through the each of the middle band 402, the top band 404 and the bottom band 406. When the outer cover 400 is to be utilized, the electronic device can be placed within the opening 408 of the outer cover 400 and is removably secured (e.g., frictional fit) to the outer cover 400. In one embodiment, the electronic device can be inserted into the opening 408 from either the primary front side or the primary rear side.

The materials utilized for the middle band 402, the top band 404 and the bottom band 406 can vary depending upon implementation. For example, the middle band 402 can be formed from a plastic that provides a relatively strong and rigid structure for the outer cover 400. For example, the middle band 102 can be formed from a plastic, such as Acrylonitrile butadiene styrene (ABS) plastic or polycarbonate. The top band 404 and the bottom band 406 can be formed from an elastomer that offers less rigidity and more compliance than does the middle band 402. For example, the top band 404 and the bottom band 406 can be formed from a thermoplastic, such as Thermoplastic Vulcanizate (TPV) or Thermoplastic Silicone Vulcanizate (TPSiV). A specific example of a suitable material for the top band 404 and the bottom band 406 is TPSiV 3515 60A.

In addition, to assist with alignment of the top band 404 and the bottom band 406 with the middle band 402 during formation of the outer cover 400, a least a portion of the inner surface of the middle band 402 can include an alignment groove 410. In the embodiment illustrated in FIG. 4, the alignment groove 410 extends along a pair of opposing sides. In one embodiment, during formation of the outer cover 400, the middle band 402 is first molded in an injection molding apparatus, and then the top band 404 and the bottom band 406 are formed in the injection molding apparatus. The alignment grooves 410 can be use to maintain alignment of the middle band 402 once it is formed. As a result, the top band 404 and the bottom band 406 are able to be formed such that they are precisely aligned with the middle band 402. More generally, the outer cover 400 can include one or more alignment features to assist with it formation. The alignment features can be not only grooves but also protrusions, detents, ribs, ridges and the like.

The sides of the outer cover 400 can include various opening or actuators so that a user is still able to access, control or interact with the buttons, connectors, ports and controls for the electronic device being protected (i.e., covered) by the outer cover 400. In the embodiment shown in FIG. 4, the outer cover 400 includes a power button opening with a power cap 412 inserted therein, an indicator light opening 414, an audio jack opening 416, a ring/silent opening 418, volume control openings with volume caps 420a and 420b inserted therein, an input/output connector opening 422, and audio port openings 424a and 424b.

By way of the power cap 412, the user can power on and off the electronic device being protected. The power cap 412 can be arranged to depress a power button on the electronic device. The indicator light opening 414 allows light from an indicator light from the electronic device to pass through the indicator light opening 414 so as to be visible to the user. The audio jack opening 416 provides an opening so that an audio jack of the electronic device can be accessed. The ring/silent opening 418 provides an opening so that a ringer/silent button of the electronic device can be accessed. The volume caps 420a and 420b enable the user of the electronic device to control the volume (up or down control). The volume cap 420a can be arranged to depress volume up button on the electronic device, and the volume cap 420b can be arranged to depress volume down button on the electronic device. The input/output connector opening 422 provides an opening so that an input/output connector can be accessed. The audio port openings 424a and 424b provide openings through which audio sound can be output (e.g., speaker output) from within the electronic device or input (e.g., microphone input) to within the electronic device.

It should be understood that the various openings or actuators of the outer cover 400 illustrated in FIG. 4 represents one embodiment that supports a configuration of a particular embodiment. In other embodiments, the number, size, placement and configuration of the buttons, connectors, ports and/or controls for an electronic device being protected (i.e., covered) by an outer cover can vary widely.

Figure 5:
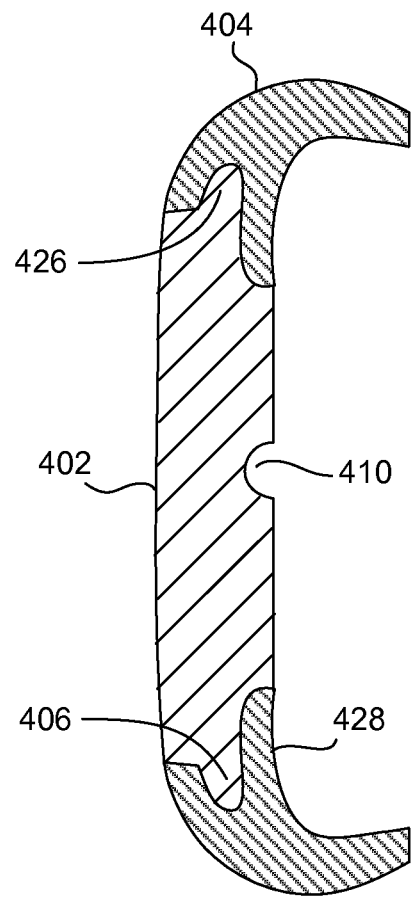
FIG. 5 is a side sectional view of the outer cover illustrated in FIG. 4, according to one embodiment.

FIG. 5 is a side sectional view of the outer cover 400 illustrated in FIG. 4, according to one embodiment. The side sectional view indicates the top band 404 affixed to the top surface of the middle band 402, and the bottom band 406 affixed to the bottom surface of the middle band 402. In this embodiment, the middle band 402, the top band 404 and the bottom band 406 can each be formed of a different material. Typically, as noted above, the material for the top band 404 and the bottom band 406 are the same but different that the material for the middle band 102. Additionally, to assist with the attachment or bonding of the top band 404 to the top surface of the middle band 402, attachment features 426 can be provided (e.g., integral with one or both of the surfaces) at the interface between the top surface of the middle band 402 and the corresponding surface of the top band 404. The number, shape and placement of the attachment features 426 can vary depending on implementation. Still further, to assist with the attachment or bonding of the bottom band 406 to the bottom surface of the middle band 402, attachment features 428 can be provided (e.g., integral with one or both of the surfaces) at the interface between the bottom surface of the middle band 402 and the corresponding surface of the bottom band 406. The number, shape and placement of the attachment features 428 can vary depending on implementation. The middle band 402 can also include at least one alignment groove 410. The at least one alignment groove 410 can assist with the forming the outer cover 400.

Figures 6A, 6B, 6C, 6D:
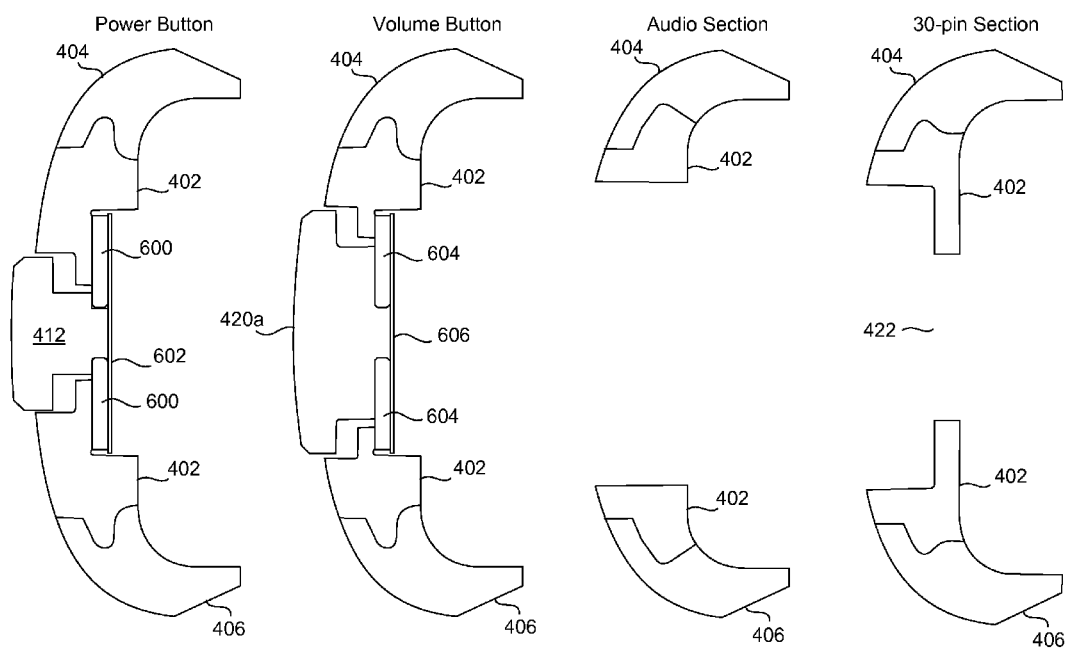
FIGS. 6A-6D are side sectional views of other portions of the outer cover illustrated in FIG. 4, according to one embodiment.

FIGS. 6A-6D are side sectional views of other portions of the outer cover 400 illustrated in FIG. 4, according to one embodiment. FIG. 6A illustrates a side section view at the portion of the side having the power cap 412. To support the power cap 412 and its operation, a power base 600 and a power label 602 can be assembled behind the power cap 412. FIG. 6B illustrates a side section view at the portion of the side having the volume cap 420a. To support the volume cap 420a and its operation, a volume base 604 and a volume label 606 can be assembled behind the volume cap 420a. FIG. 6C illustrates a side section view at the portion of the side having the audio jack opening 416. FIG. 6D illustrates a side section view at the portion of the side having the input/output connector opening 422.

Figure 7:
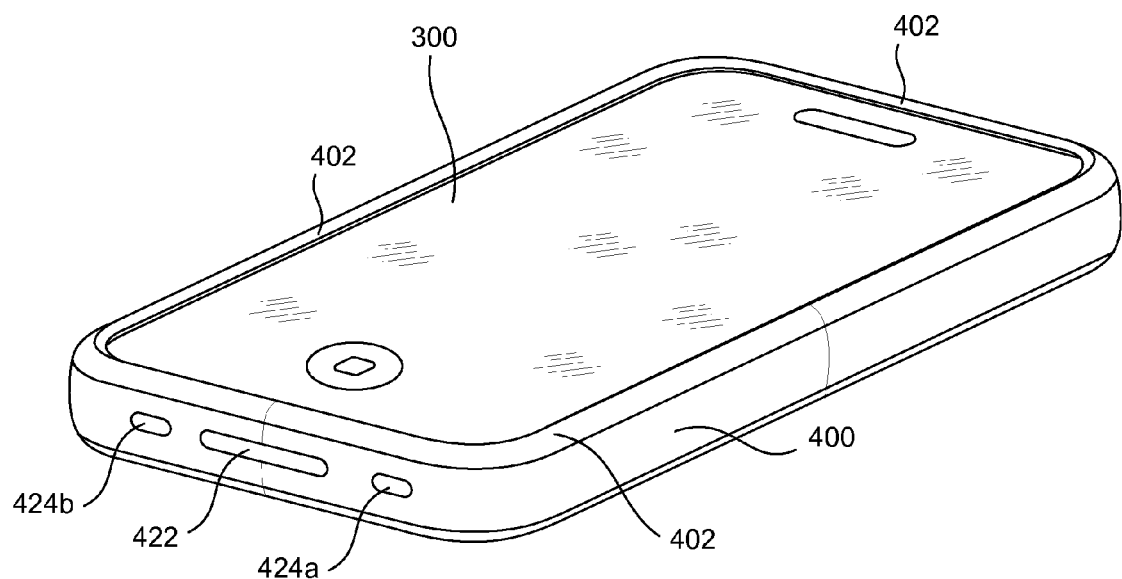
FIG. 7 is a perspective view of an outer cover provided on the portable electronic device illustrated in FIG. 3A.

FIG. 7 is a perspective view of an outer cover 400 provided on the portable electronic device 300 illustrated in FIG. 3A. The outer cover 350 can, for example, be similar to the outer cover 400 illustrated in FIG. 4. As shown in FIG. 7, when the portable electronic device 300 is inserted into the outer cover 400, sides of the portable electronic device 300 are protected by the corresponding sides of the outer cover 400. The front and rear surfaces of the portable electronic device 300 remain exposed and are not covered. However, the front and rear surfaces of the portable electronic device 300 can be partly protected at the edges. Here, the outer cover 300 does provide covering for the edges of the front and rear surfaces and is able to provide some protection. For example as shown in FIG. 3B, the outer cover 400 include a front surface edge cover 402 that extends around the periphery of the outer cover 400. Also, as shown in FIG. 7, the bottom side and thus the input/output connector opening 422 and the audio port openings 424a and 424b in the outer cover 400 are visible and aligned with the corresponding openings of the portable electronic device 300.

Figure 8:
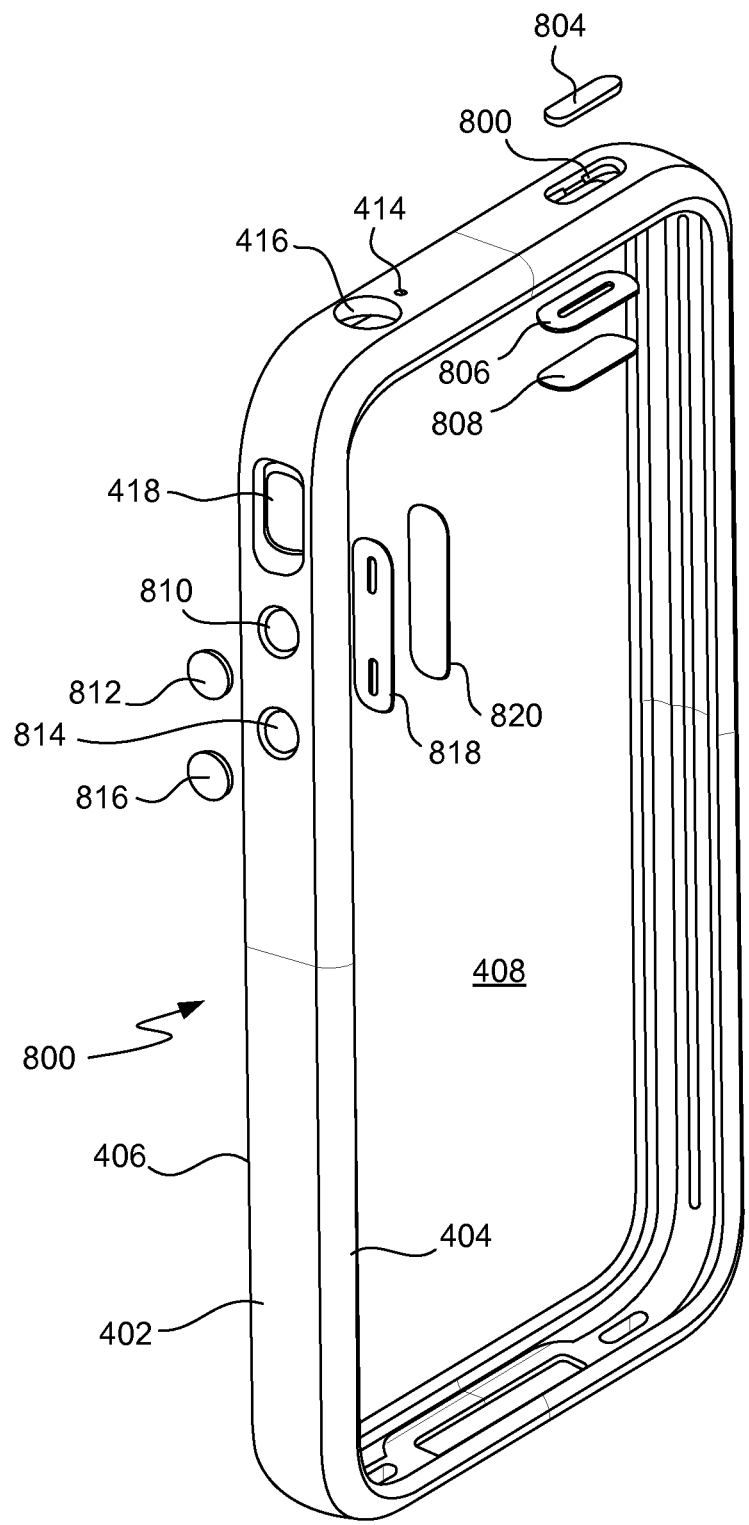
FIG. 8 is an exploded assembly diagram illustrating assembly of a power actuator and a volume actuation for an outer cover according to one embodiment.

FIG. 8 is an exploded assembly diagram illustrating assembly of a power actuator and a volume actuation for an outer cover according to one embodiment. The outer cover 800 shown in FIG. 8 is the same as the outer cover 400 illustrated in FIG. 4, though the power actuator and volume actuation are shown as assemblies. For the power actuator, the outer cover 800 includes an opening 802 for receiving a power cap 804. On the inside of the outer cover 800, there is a base plate 806 and a label 808. The base plate 806 can be metal (e.g., stainless steel) and the label 808 can be plastic (e.g., Polyethylene terephthalate (PET)). For the volume actuator, the outer cover 800 includes a first openings 810 that receives a first power cap 812, and a second opening 814 that receives a second power cap 816. On the inside of the outer cover 800, there is a base plate 818 and a label 820. The base plate 818 can be metal (e.g., stainless steel) and the label 820 can be plastic (e.g., Polyethylene terephthalate (PET)).

Figure 9:
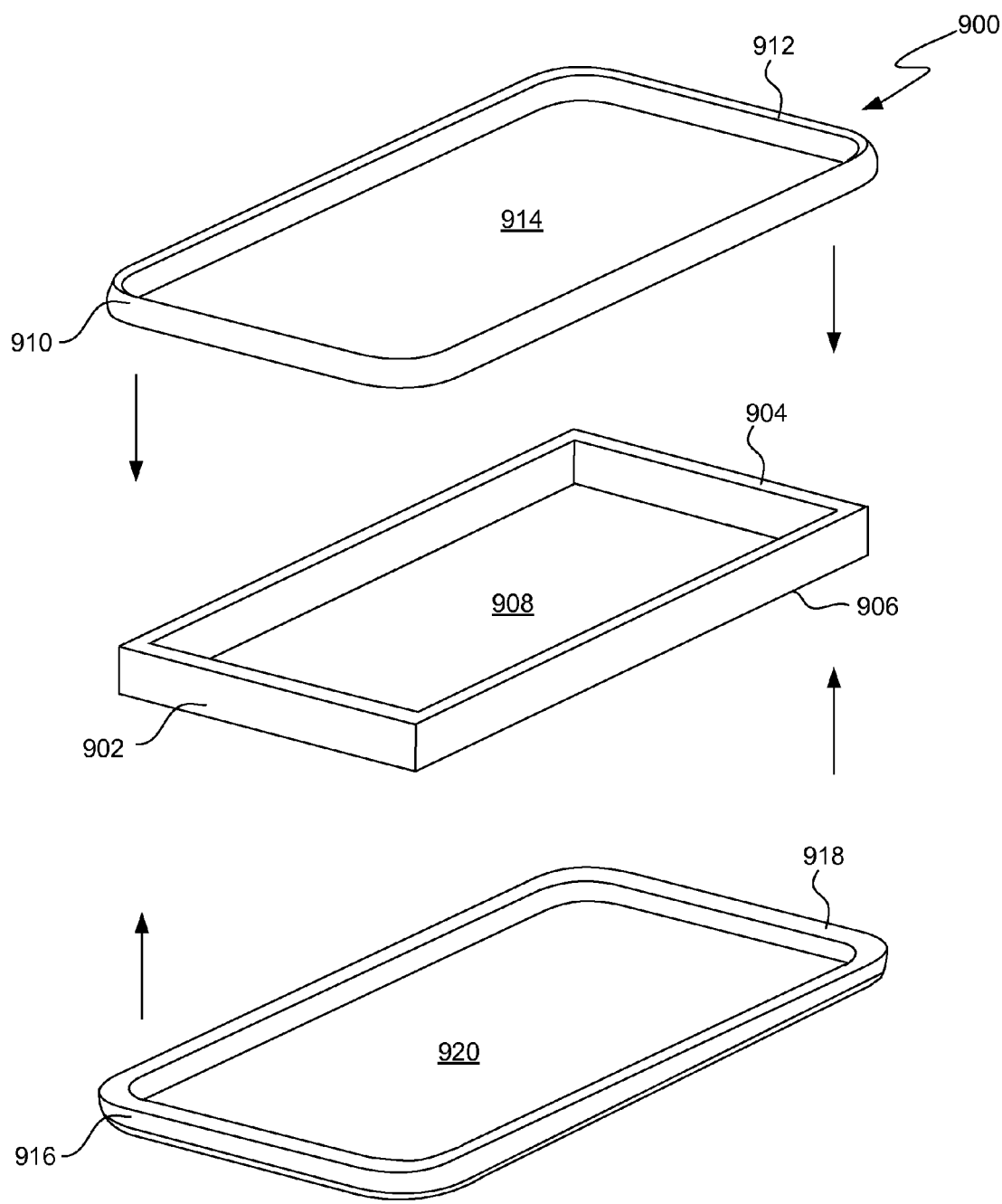
FIG. 9 is an exploded assembly diagram for an outer cover according to one embodiment.

FIG. 9 is an exploded assembly diagram for an outer cover 900 according to one embodiment. The outer cover 900 can be formed from a middle band structure 902 having a top surface 904 and a bottom surface 906. The middle band structure 902 provides an opening 908 around which the middle band 902 extends.

The outer cover 902 can also include a top band structure 910. The top band structure 910 includes a bottom surface 912. The top band structure 910 provides an opening 914 around which the top band structure 910 extends. The assembly for the outer cover 900 can include attachment of the top band structure 910 to the middle band structure 902. The attachment can use chemical bonding, adhesive or mechanical structures to mechanically couple the top band structure 910 to the middle band structure 902. When the top band structure 910 is attached or bonded to the middle band structure 902, the bottom surface 912 of the top band structure 910 can be placed adjacent to the top surface 904 of the middle band structure 902 and secured thereto. Additionally, when the top band structure 910 is attached to the middle band structure 902, the opening 914 within the top band structure 910 is substantially aligned with the opening 908 within the middle band structure 902.

The outer cover 902 can also include a bottom band structure 916. The bottom band structure 916 includes a top surface 918. The bottom band structure 916 provides an opening 920 around which the bottom band structure 916 extends. The assembly for the outer cover 900 can include attachment of the bottom band structure 916 to the middle band structure 902. The attachment can use chemical bonding, adhesive or mechanical structures to mechanically couple the bottom band structure 916 to the middle band structure 902. When bottom top band structure 916 is attached or bonded to the middle band structure 902, the top surface 918 of the bottom band structure 916 can be placed adjacent to the bottom surface 906 of the middle band structure 902 and secured thereto. Additionally, when the bottom band structure 916 is attached to the middle band structure 902, the opening 920 within the bottom band structure 916 is substantially aligned with the opening 908 within the middle band structure 902.

In the embodiment illustrated in FIG. 9, the outer cover 900 is formed from the middle band member 902, the top band member 910 and the bottom band member 916. These members 902, 910 and 916 are attached together to for the outer cover 900. Since these members 902, 910 and 916 are separate structures that are assembled together, they can be formed from same or different materials.

In an alternative embodiment, an outer cover can be form from a single material. In such case, the assembly for the outer cover need not form separate members that are then secured to one another (as, for example, the case with FIG. 9). Instead, the outer cover can be formed as a single piece (i.e., a unitary structure).

Figure 10:
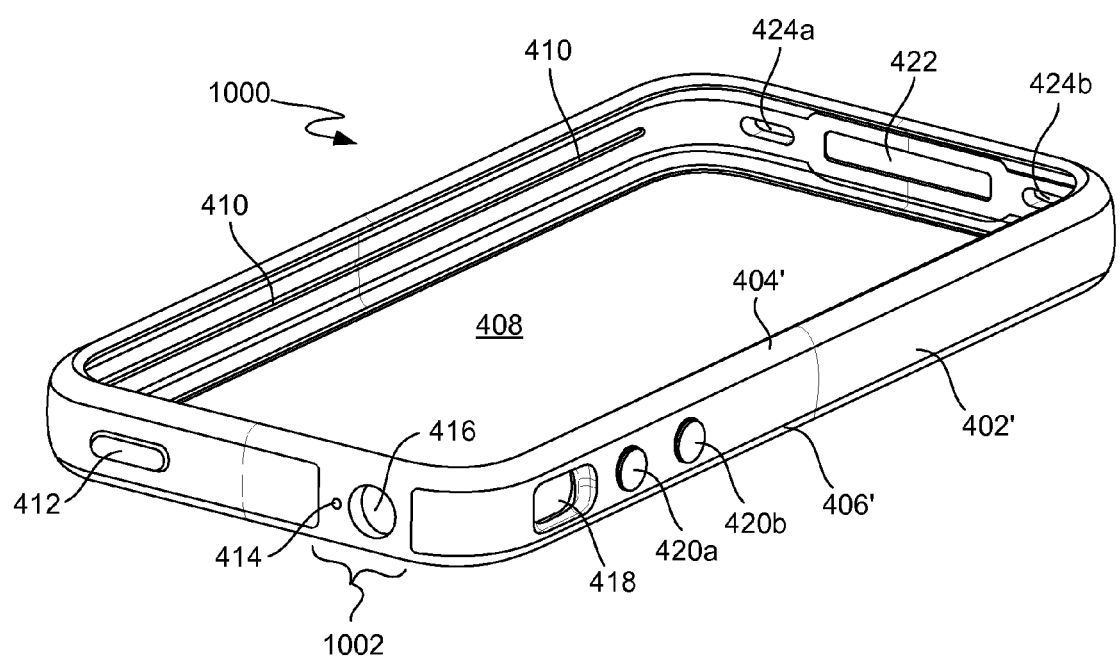
FIG. 10 is a perspective diagram of an outer cover for an electronic device according to another embodiment.

FIG. 10 is a perspective diagram of an outer cover 1000 for an electronic device according to another embodiment. The outer cover 1000 is generally similar to the outer cover 400 illustrated in FIG. 4. However, the outer cover 1000 forms a section 1002 (or portion) within the middle band 402' with a compliant material, such as an elastomer. The section 1002 can also be referred to as a compliant section. The compliant material can, for example, be the same material as the top band 404' and the bottom band 406'. In one implementation, the top band 404', the bottom band 406' and the section 1002 can all be formed together, such as in a common molding process. Typically, the thickness (i.e., height) of the middle band 402' is greater than the thickness of the top band 404' and the bottom band 406'.

The outer cover 1000 can serve to protect at least a portion of a housing of the electronic device. Typically, the electronic device is a portable device, i.e., a portable electronic device. By providing the outer cover 1000 with the section 1002 of compliant material, the middle band 402' is able to temporarily expand so that the electronic device can be fit within the opening 409 of the outer cover 1000. Since the middle band 402' is otherwise a rigid structure for protection of the electronic device, the provisioning of the section 1002 of compliant material allows better product usage as well as reliability. For example, the middle band 402' may be primarily formed from a plastic, such as Acrylonitrile butadiene styrene (ABS) plastic or polycarbonate, and the section 1002 can be formed of a thermoplastic, such as Thermoplastic Vulcanizate (TPV) or Thermoplastic Silicone Vulcanizate (TPSiV).

Although the middle band 402' can be primarily rigid, the presence of the section 1002 also the middle band 402' and thus the outer cover 1000 to expand. The width of the section 1002 impacts the degree of expansion available and thus the expandability of the outer cover 1000 can be modified by altering the width of the section 1002. For example, in some embodiments, the width of the section 1002 is less than a quarter of the width of the outer cover 1000 (i.e., width of the side including the section 1002).

Although the section 1002 providing the compliant section of the middle band 402' can be placed anywhere, in the embodiment shown in FIG. 10, the section 1002 is proximate to a corner of the outer cover 1000 and also include one or more opening therein 414 and 416 which can impact the degree to which the middle band 402' can expand. The opening 414 and 416 in the outer cover 100 can allow access (e.g., visual or physical) to the electronic device.

In one embodiment, from a materials perspective, the section 1002 in the middle band 402' renders the middle band 402' non-continuous as to its rigid material characteristic.

Various techniques may be used to form the desired shape/configuration of an outer cover including for example molding or casting techniques. Various molding techniques include compression molding, transfer molding, injection molding, and the like. Some techniques that may be useful to integrate electronics into the molded part include insert molding and/or double shot injection molding.

Figure 11:
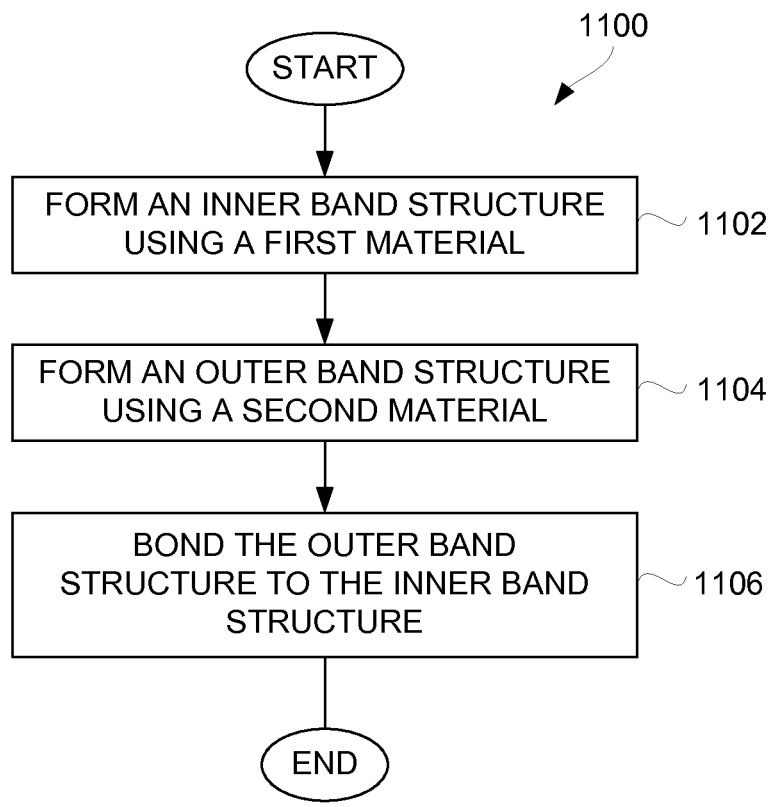
FIG. 11 is a flow diagram of an outer cover formation process according to one embodiment.

FIG. 11 is a flow diagram of an outer cover formation process 1100 according to one embodiment. The outer cover formation process 1000 can be performed to form an outer cover, such as the outer cover 100 illustrated in FIG. 1 or the outer cover 400 illustrated in FIG. 4.

The outer cover formation process 1100 can form 1102 an inner band structure using a first material. Then, an outer band structure can be formed 1104 using a second material. If there is a cut-out section (or compliant section) to be provided within an inner band, then the cut-out section can also be formed using the second material. After the inner band structure and the outer band structure had be formed 1102 and 1104, the outer band structure can be bonded 1106 to the inner band structure. Following the block 1106, the outer cover formation process 1100 can end.

However, it should be understood that the outer cover may further include an additional outer band. If an additional outer band is provided, the additional outer band can be bonded to an opposing surface of the inner band structure. For example, the initial outer band structure can be bonded to a top side of the inner band structure, and the additional outer band structure can be bonded to the bottom side of the inner band structure.

Figure 12:
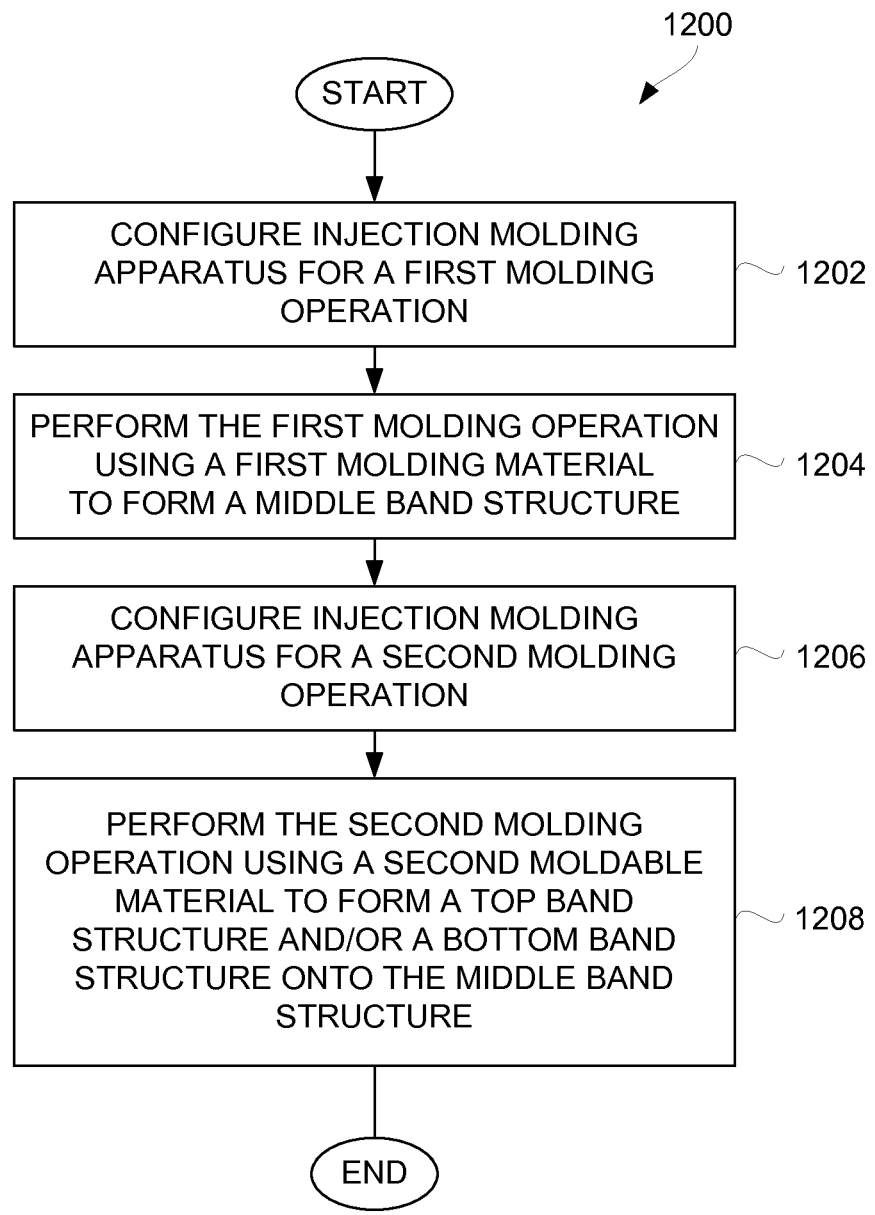
FIG. 12 is a flow diagram of a molding process according to one embodiment of the invention.

FIG. 12 is a flow diagram of a molding process 1200 according to one embodiment of the invention. The molding process 1200 operates to produce an outer cover. For example, the outer cover being produced by the molding process 1200 can pertain to the outer cover 100 illustrated in FIG. 1 or the outer cover 400 illustrated in FIG. 4.

The molding process 1200 initially configures 1202 an injection molding apparatus for a first molding operation. Typically, during the configuration 1202, one or more molding plates are placed within the injection molding apparatus to provide a mold for a first portion of the outer cover being formed. After the injection molding apparatus has been configured 1202, the first molding operation can be performed 1204 using a first moldable material to form a middle band structure for the outer cover.

Next, the injection molding apparatus can be configured 1206 for a second molding operation. Here, configuration of the injection molding apparatus for the second molding operation can involve placing one more different plates within the injection molding apparatus to form a second portion of the outer cover being formed. Thereafter, the second molding operation can be performed 1208 using a second moldable material to form a top band structure and/or a bottom band structure onto the middle band structure. Here, in one implementation, the middle band structure being formed by the second molding operation can remain within the injection molding apparatus during formation of the top band structure and/or the bottom band structure. By doing so, the top band structure and/or the bottom band structure can be molded, and thus bonded to the middle band structure, with accurate alignment. By bonding at the top band structure and/or the bottom band structure onto the middle band structure, the resulting outer cover is strong and reliable. Additionally, the top band structure and/or the bottom band structure are able to be molded using a different material than that used to mold the middle band structure. For example, as noted above, the middle band structure can be relatively rigid, while the top band structure and/or the bottom band structure can be relatively compliant.

Also, if there is a cut-out section (or compliant section) to be provided within the middle band structure, then the cut-out section can also be formed using the second moldable material. For example, the same the injection molding step (e.g., shot) used to form of the top band structure and/or the bottom band structure can form the cut-out section.

The various aspects, embodiments, implementations or features of the invention can be used separately or in any combination.

The advantages of the invention are numerous. Different embodiments or implementations may, but need not, yield one or more of the following advantages. One advantage of certain embodiments of the invention is that a cover having one or more electronic components embedded therein can serve to extend or augment capabilities of a portable electronic device being covered by the cover. For example, the one or more electrical components provided in a cover can be used (i) to extend input/output capabilities of the portable electronic device, (ii) to augment functional capabilities of the portable electronic device; and/or (iii) to associate ornamental aspects to the portable electronic device.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A protective cover for a portable electronic device, comprising:
   a middle ring having at least one opening for access to an input component of the portable electronic device, the middle ring having a substantially flat side;
   a top ring integral with or attached to a top portion of the middle ring, the top ring having a curved cross-section; and
   a bottom ring integral with or attached to a bottom portion of the middle ring, the bottom ring having a curved cross section wherein
   the top ring, the bottom ring, and the middle ring are aligned to secure the protective cover to a top surface and a bottom surface of the portable electronic device and so that the substantially flat side of the middle ring is substantially flush with an entire peripheral surface of the portable electronic device.

2. The protective cover as recited in claim 1, wherein the protective cover comprises at least one opening with a depressible actuator for use in activating a user input device of the portable electronic device while the portable electronic device is placed within the protective cover.

3. The protective cover as recited in claim 1, wherein the middle ring is formed from a plastic, and wherein the top ring and the bottom ring are formed from a thermoplastic.

4. The protective cover as recited in claim 3, wherein the thermoplastic comprises silicone.

5. The protective cover as recited in claim 1, wherein the portable electronic device is able to be attached to the protective cover by inserting the portable electronic device into the protective cover from either a top side or a bottom side of the protective cover, and wherein the protective cover is configured to match the configuration of the portable electronic device so that the protective cover is removably securable thereto.

6. A protective cover as recited in claim 5, wherein the middle ring includes an alignment feature configured to maintain alignment with the top ring and the bottom ring in the protective cover.

7. A ring-shape cover having an opening configured to receive a portable electronic device, the ring-shaped cover comprising:
   a center band primarily formed of a first material, the center band having a substantially flat side;
   a top band formed of a second material and integral with a top portion of the center band; and
   a bottom band formed of the second material and integral with a bottom portion of the center band; wherein
   the top band, the bottom band, and the center band are aligned to secure the ring-shape cover to the portable electronic device and so that the substantially flat side of the center band is substantially flush with an entire peripheral surface of the portable electronic device.

8. The ring-shaped cover as recited in claim 7, wherein each of the center band, the top band and the bottom band surround the opening.

9. The ring-shaped cover as recited in claim 7, wherein the ring-shaped cover is able to be attached to the portable electronic device by inserting the portable electronic device into the opening, and
   wherein the portable electronic device is able to be inserted into the ring-shaped cover by way of either the bottom band or the top band.

10. The ring-shaped cover as recited in claim 7, wherein the first material is less compliant that the second material.

11. The ring-shaped cover as recited in claim 7, wherein the center band include an alignment feature configured to maintain alignment with the top band and the bottom band in the ring-shape cover.

12. The ring-shaped cover as recited in claim 7, wherein the center band include a compliant section that facilitates expansion.

13. An edge cover for an electronic device, comprising:
   a removable peripheral member that surrounds peripheral sides of an electronic device in order to protect the peripheral sides of the electronic device, the peripheral member having an opening extending through the peripheral member and configured to receive the electronic device, wherein the peripheral member forms a band configured to fit around the peripheral sides of the electronic device, and the peripheral member comprises a substantially flat middle portion that is substantially flush with all peripheral sides of the electronic device, the flat middle portion aligned with a curved top portion and a curved bottom portion, the curved top portion and the curved bottom portion configured to secure the edge cover to a top and a bottom surface of the electronic device.

14. The edge cover as recited in claim 13, wherein the removable member include a compliant section that facilitates expansion of the opening in the peripheral member for insertion of the electronic device therein.

15. An expandable edge cover for an electronic device, comprising:
- a first portion in the form of a middle band having a cut out section thereby making it non-continuous, the middle band comprising a substantially flat side; and
- a second portion integrally formed with the first portion, the second portion filling the cut out section and forming a continuous upper and lower band, the second portion being formed from a compliant material thereby allowing the edge cover to flex when the electronic device is inserted therein; wherein the middle band is aligned with the upper and lower band to secure the expandable edge to a top surface and a bottom surface of the electronic device and so that the substantially flat side of the middle band is substantially flush with an entire peripheral surface of the electronic device.

16. The expandable edge cover as recited in claim 15, wherein the expandable edge cover serves to cover top, bottom and left and right sides of the electronic device.

17. The expandable edge cover as recited in claim 15, wherein the thickness of the middle band is greater than the thickness of the upper band or the lower band.

18. The expandable edge cover as recited in claim 15, wherein the cut out section includes an opening.

19. The expandable edge cover as recited in claim 15, wherein the electronic device includes a middle portion and an upper and lower portion, and wherein the middle band substantially corresponds to the middle portion, and the upper and lower bands substantially correspond to the upper and lower portions, wherein the upper and lower portions are formed from ceramics or glass.

20. The expandable edge cover as recited in claim 15, wherein the upper and lower bands include a flange section configured to cover front and rear face edges of the electronic device.

21. The expandable edge cover as recited in claim 15, wherein the second portion is over molded relative to the first portion.

22. The expandable edge cover as recited in claim 15, wherein the first portion is done with a first shot and the second portion is done with a second shot in a double injection molding operation.

* * * * *

UNITED STATES PATENT AND TRADEMARK OFFICE
CERTIFICATE OF CORRECTION

| | | |
|---|---|---|
| PATENT NO. | : 8,655,422 B2 | Page 1 of 1 |
| APPLICATION NO. | : 12/794570 | |
| DATED | : February 18, 2014 | |
| INVENTOR(S) | : Kurt Stiehl et al. | |

It is certified that error appears in the above-identified patent and that said Letters Patent is hereby corrected as shown below:

In the Claims:

Column 16, Lines 8-9, (Claim 17, Line 2): replace both instances of "the thickness" with --a thickness--.

Signed and Sealed this
Sixth Day of May, 2014

Michelle K. Lee
*Deputy Director of the United States Patent and Trademark Office*